United States Patent [19]

Richter

[11] Patent Number: 5,118,058
[45] Date of Patent: Jun. 2, 1992

[54] UNIVERSAL ADJUSTABLE MOUNT

[75] Inventor: Gary L. Richter, Reno, Nev.

[73] Assignee: Panavise Products, Inc., Sparks, Nev.

[21] Appl. No.: 719,326

[22] Filed: Jun. 20, 1991

[51] Int. Cl.⁵ ............................................. F16M 11/12
[52] U.S. Cl. .................................. 248/183; 248/278; 403/55
[58] Field of Search ............... 248/183, 179, 279, 278; 269/75; 403/147, 148, 146, 165, 166, 87, 110, 55, 53

[56] References Cited

U.S. PATENT DOCUMENTS

| | | | |
|---|---|---|---|
| 830,238 | 9/1906 | Lamb | 403/87 X |
| 1,375,888 | 4/1921 | Baer | 403/55 |
| 2,673,054 | 3/1954 | Slavik | 248/181 |
| 2,692,756 | 10/1954 | Lincoln | 403/55 X |
| 2,802,633 | 8/1957 | Moore | 403/55 X |
| 2,898,068 | 8/1959 | Warren | 248/183 |
| 3,661,376 | 5/1972 | Hill | 269/75 |
| 3,815,892 | 6/1974 | Tulk | 269/75 |
| 5,016,851 | 5/1991 | Koskinen | 248/278 |

*Primary Examiner*—J. Franklin Foss
*Attorney, Agent, or Firm*—Stetina and Brunda

[57] ABSTRACT

The present invention relates to a universal adjustable mount for use as a work support device which comprises a base, a split housing rotatably mounted to the base, a post, and a split bushing for releasably receiving the post and for selectively gripping the post. The bushing is mounted within the housing for turning movement about an axis, and the housing, the bushing and the post are selectively arrestable and subsequently releasable upon actuation of a single clamp device. The interior of the housing is formed so as to maintain the bushing in its arrested orientation relative thereto. The device further includes a leaf spring mounted between the bushing and the housing which is operable to snug the bushing against the housing during actuation of the clamping means to the locked position.

6 Claims, 2 Drawing Sheets

UNIVERSAL ADJUSTABLE MOUNT

FIELD OF THE INVENTION

The present invention relates generally to work support devices and more particularly to a support device which may be turned or tilted about three axes of adjustment and may selectively be retained in selected positions by actuation of a single clamp device.

BACKGROUND OF THE INVENTION

Support devices which permit movement relative multiple axes are widely used among manufacturers, artisans, and hobbyists. Examples of such devices are disclosed in U.S. Pat. Nos. 2,898,068 and 3,661,376.

Through these devices present significant advances in the art of work support devices, they possess certain deficiencies which detract from their overall utility. Foremost of these deficiencies is the difficulty these devices have in maintaining heavy objects in angled orientations relative their base members. With particular reference to the prior art support device disclosed in U.S. Pat. No. 3,661,376, the device comprises a bushing mounted within a carrier for turning movement about an axis with the carrier itself being rotatably mounted into a base structure. Through the actuation of a single clamp, the bushing, carrier and the post mounted within the bushing are selectively arrestable and releasable in desired orientations. However, in this particular reference, the post and bushing are maintained in a selected position within the carrier through the abutment of a flat surface of the bushing against a corresponding flat surface of the carrier. As will be recognized, such surface-to-surface contact is not well suited to maintaining the orientation of the bushing within the carrier when the post within the bushing is arrested in an angled orientation. In this respect, heavy objects interfaced to the distal end of the angled post tend to cause the flat surfaces of the carrier and bushing to slide relative one another. To prevent such slippage from occurring, the user of the support device will oftentimes tighten the clamping member through the use of a wrench or similar device in an attempt to maintain the abutting contact between the flat surfaces of the carrier and bushing. However, this tightening technique is generally not successful in preventing the bushing from sliding within the carrier and oftentimes leads to breakage of the clamping member due to over-torquing. The present invention overcomes these and other deficiencies associated with prior art multiple axis support devices.

SUMMARY OF THE INVENTION

In accordance with the preferred embodiment of the present invention, there is provided a universal adjustable mount which comprises, in combination, a base member, a housing rotatably mounted to the base member, an elongate post, and a bushing for rotatably receiving and selectively gripping the post. In the preferred embodiment, the bushing is mounted within the housing for turning movement about an axis. The adjustable mount of the present invention further comprises a clamping means in force transmitting relationship with the housing for selectively actuating the housing between an unlocked position and a locked position. When in the locked position, the housing is placed into locking engagement with the base member and the bushing into locking engagement with the housing and gripping engagement with the post. A locking means which is formed within the housing is also provided for maintaining the bushing in locking engagement with the housing when the clamping means is actuated to the locked position.

In the preferred embodiment, the clamping means comprises a threaded member which is threaded into the housing and extends substantially along the aforementioned axis. The threaded member includes a first end in force transmitting relationship with the bushing and a second end including a handle positioned thereon. The housing of the present invention preferably has a split configuration and comprises a first part and a second part while the bushing, which also has a split configuration, comprises a first half and a second half. The threaded member is threadably received into the first part of the housing so as to be in force transmitting relationship with the first half of the bushing. As such, actuation of the threaded member to the locked position causes the second half of the bushing to be firmly abutted against an interior portion of the second part of the housing.

The preferred locking means comprises a sloped surface which is formed within the interior of the second part of the housing in a manner such that a peripheral portion of the second half of the bushing will be firmly abutted there against when the threaded member is actuated to the locked position. Through such abutting contact, the peripheral portion of the second half of the bushing is prevented from sliding relative the sloped surface of the second part of the housing.

The adjustable mount of the present invention further comprises a leaf spring positioned between the housing and the bushing. In the preferred embodiment, the leaf spring comprises a resilient disk which is peripherally in force transmitting engagement with the first half of the bushing and includes a center portion which is spaced from the first half and in contact with the threaded member of the clamping means. The disk is operable to bias the bushing toward the second part of the housing when the clamping means is actuated from the unlocked position to the locked position. Particularly, the disk functions to snug the peripheral portion of the second half of the bushing against the sloped surface of the second part of the housing, thereby allowing the position of the post to be adjusted before final tightening of the clamping means occurs.

It is an object of the present invention to provide a support device which may be turned or tilted about three axes of adjustment and may be selectively maintained in selected positions by actuation of a single clamp device.

Another object of the present invention is to provide a support device which is adapted not to slip when heavy objects are maintained in a turned or tilted orientation.

BRIEF DESCRIPTION OF THE DRAWINGS

These as well as other features of the present invention will become more apparent upon reference to the drawings wherein.

DETAILED DESCRIPTION OF THE PREFERRED EMBODIMENT

Figure 1:
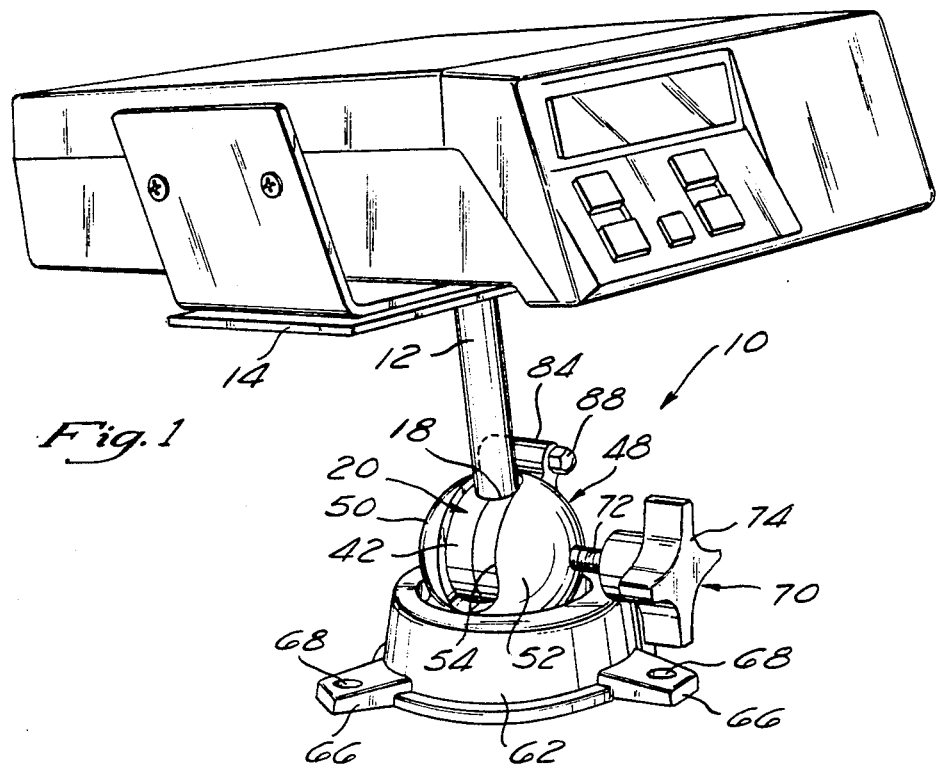
FIG. 1 is a perspective view of the adjustable mount of the present invention during use in conjunction with a heavy object.

Referring now to the drawings wherein the showings are for purposes of illustrating a preferred embodiment of the present invention only, and not for purposes of limiting the same, FIG. 1 perspectively illustrates the adjustable mount 10 of the present invention. The adjustable mount 10 comprises an elongate post 12 having a generally cylindrical configuration and including a table 14 connected to its distal end for purposes of supporting a workpiece 16.

Figure 2:
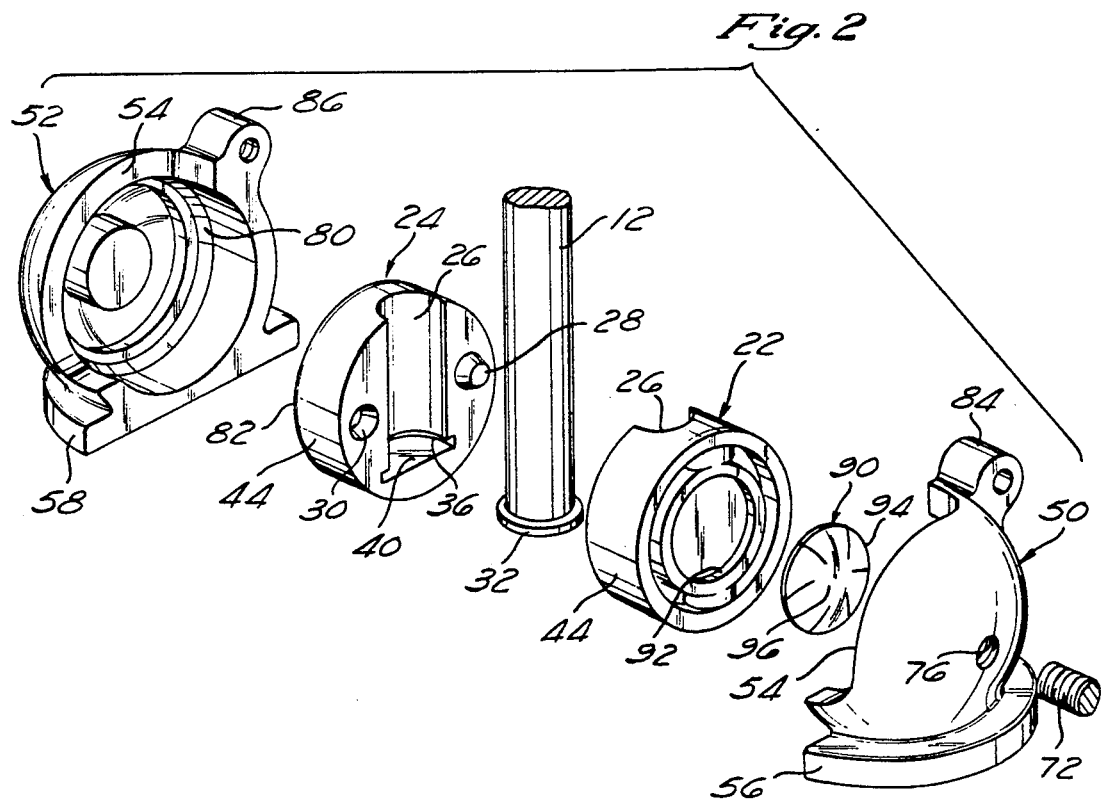
FIG. 2 is an exploded view illustrating the components comprising the adjustable mount of the present invention.

The post 12 is rotatably received within a cylindrical bore 18 provided by a bushing 20. In the preferred embodiment, bushing 20 is split on a plane containing the axis of post 12 and therefore comprises a first half 22 and a second half 24. As seen in FIG. 2, first half 22 and second half 24 each include identically configured, semi-circular recesses 26 formed therein which form cylindrical bore 18 when first half 22 and second half 24 are interconnected. The attachment to first half to second half 24 is preferably facilitated by corresponding projections 28 and detents 30 formed on and within the halves 22 and 24. Formed on the proximal end of post 12, which is received into cylindrical bore 18, is a flange 32. Flange 32 is received into an annular channel 34 which is disposed adjacent the bottom of bore 18 and formed from identically configured semi-circular grooves 36 disposed within halves 22 and 24. As will be recognized, since post 12 is rotatably interfaced to bushing 20, the receipt of flange 32 into channel 34 prevents post 12 from being slidably removed from within bore 18 yet permits rotational movement of post 12 therewithin. When residing within bore 18, the lower surface of post 12 rests against the end surface 38 of bore 18 which is formed by the semi-circular surfaces 40 of halves 22 and 24. As can be appreciated, due to the inclusion of flange 32 on the proximal end of post 12, post 12 is not receivable into bore 18 after halves 22 and 24 have been interconnected. As such, first half 22 and second half 24 are individually positioned about the proximal end of post 12 and joined to one another to facilitate the interface of post 12 to bushing 20.

When formed by first half 22 and second half 24, bushing 20 has a generally circular configuration defining an outer cylindrical surface 42 formed by the combination of the cylindrical surfaces 44 of first half 22 and second half 24. In the preferred embodiment, the cylindrical outer surface 42 of bushing 20 is received within a cylindrical cavity 46 provided within a housing 48 having a generally spherical configuration. Importantly, the axis of the cylindrical cavity 46 intersects the axis of post 12 at a right angle. Like the bushing 20, the housing 48 has a split configuration and comprises a first part 50 and a second part 52, each of which have generally semi-spherical configurations. Importantly, when first part 50 and second part 52 are interconnected, an arcuate clearance slot 54 is provided in the housing 48 through which the post 12 extends. Additionally, when bushing 20 is disposed within cavity 46, the plane of separation of housing 48 is substantially the same as the plane of separation of bushing 20.

Housing 48 includes a circular flange 56 formed about the lower end thereof. Circular flange 56 is formed from the semi-circular flanges 58 formed of first part 50 and second part 52 when parts 50 and 52 are interconnected. In the preferred embodiment, the circular flange 56 is received into a bore 60 of a stationary base 62. A lip 64 formed on the base 62 and a detachable retainer plate (not shown) maintain the flange 56 in position within the base 62. The base 62 may be secured to a work bench or table or other support via a plurality of extensions 66 extending radially therefrom which include apertures 68 therein for receiving screw fasteners or the like. Assuming that the base 62 is secured to a horizontal surface, the housing 48 is free to turn with respect to the base 62 about a vertical axis. Additionally, the bushing 20 is free to turn with respect to housing 48 about a horizontal axis with the extent of movement being limited by the length of the arcuate slot 54. Further, the post 12 is free to turn with respect to the bushing 20 about its own longitudinal axis.

Advantageously, all of the aforementioned motions may be arrested simultaneously and the post 12, bushing 20 and housing 48 locked in any desired position by manual actuation of a clamping device 70. In the preferred embodiment, clamping device 70 comprises a threaded member 72 having a knob 74 positioned on one end thereof for turning and adjusting the threaded member 72. The clamping device 70, and more particularly threaded member 72, is received into an aperture 76 disposed within first part 50 of housing 48 so as to be in coaxial alignment with the turning axis of the bushing 20. Aperture 76 is internally threaded so as to threadably receive the threaded member 72.

Figure 3:
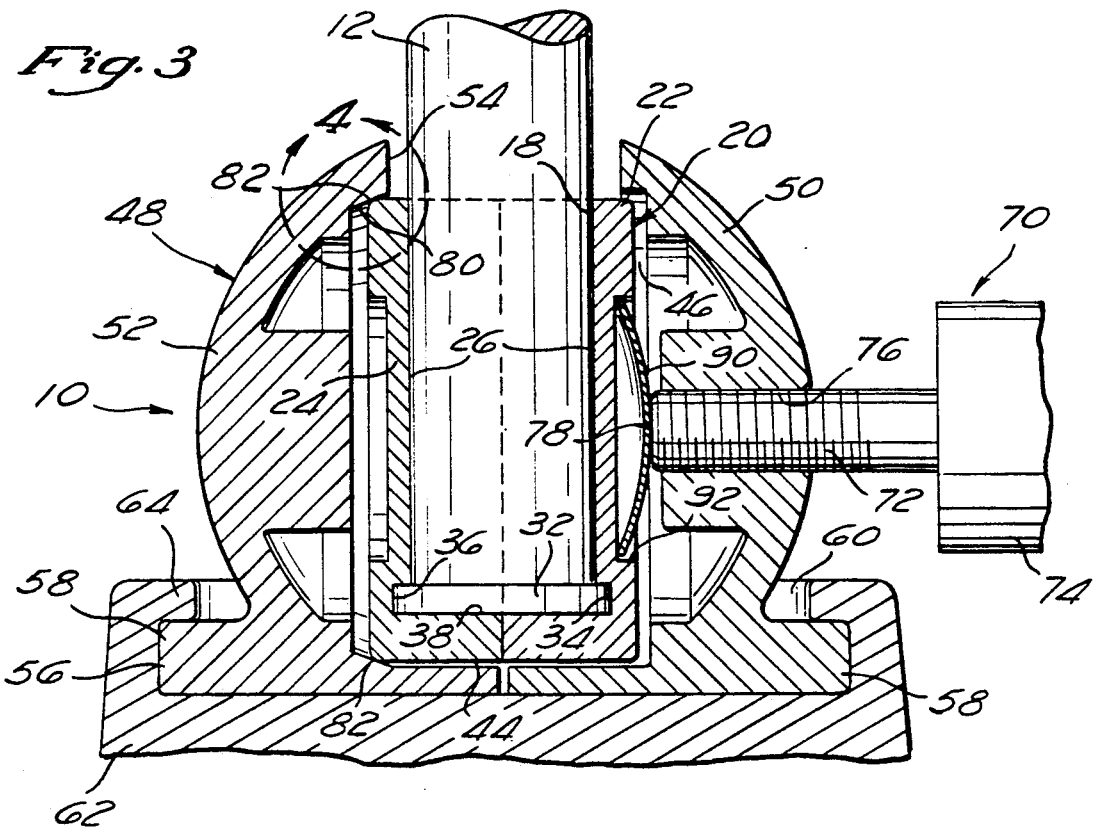
FIG. 3 is a cross-sectional view of the adjustable mount of the present invention, illustrating the engagement of the bushing to the housing.
Figure 4:
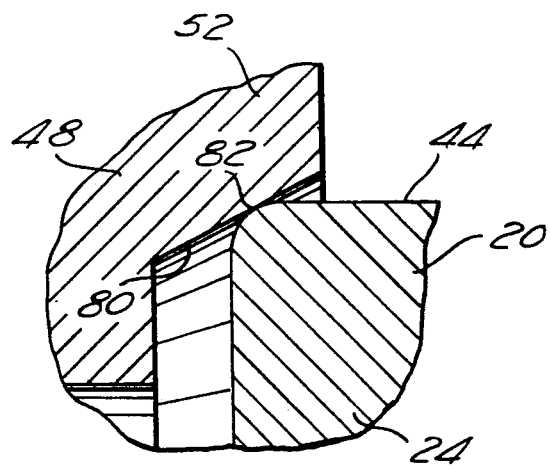
FIG. 4 is an enlarged sectional view of area 4 shown in FIG. 3.

Referring now to FIGS. 3 and 4, as previously specified, clamping device 70 is operable to simultaneously arrest the motions of the post 12 within the bushing 20, the bushing 20 within the housing 48 and the housing 48 within the base 62. Such locking of the aforementioned components is facilitated by turning the knob 72 in a clockwise direction so as to cause threaded member 72 to extend through aperture 76 such that the flat distal end 72 thereof comes into direct force transmitting contact with a leaf spring 90 disposed between threaded member 72 and the first half 22 of bushing 20, as seen in FIG. 3. As will be recognized, due to the engagement of leaf spring 90 to first half 22, the force exerted against leaf spring 90 by turning the knob 74 causes bushing 20 to be pushed through cavity 46 toward second part 52 of housing 48. The reasons for the inclusion of leaf spring 90 will be discussed in greater detail below. In the preferred embodiment, second part 52 of housing 48 includes a sloped surface 80 formed about the periphery of an interior portion thereof. Additionally, second half 24 of bushing 20 is formed having a radiused peripheral edge 82 thereon. Advantageously, the abutment of radiused edge 82 against sloped surface 80 facilitated by the movement of bushing 20 toward first part 52, will cause bushing 20 to become looked within cavity 46. In this respect, bushing 20 is maintained in a desired orientation relative the horizontal axis and not subject to slippage relative to the housing 48. Additionally, as radiused edge 82 is forced against sloped surface 80, the first half 22 and second half 24 of bushing 20 are forced together thereby frictionally clamping post 12 therebetween and thus preventing any rotational movement of post 12. Further, the reaction force of threaded member 72 on first part 50 serves to spread first part 50 and second part 52 thereby causing the flange 56 to be gripped frictionally within the enclosing shoulder of the bore 60 within the base 62. Thus, as a result, all of the aforementioned parts are frictionally clamped against movement by the action of the clamping device 70. Accordingly, the user can use one hand to adjust the position of the adjustable mount 10 and use the other hand to clamp all of the parts, thus holding the mount 10 in its adjusted position. Importantly, sloped surface 80 is formed at an angle which is shallow enough to prevent the peripheral edge 82 of second half 24 from remaining in locked engagement thereto when threaded member 72 is moved to the unlocked position, i.e. turned in a counter-clockwise direction. In this respect, bushing 20 will automatically release itself from its locked engagement with second part 52 when not forced thereagainst by the threaded member 72.

As seen in FIGS. 1 and 2, ears 84 and 86 may be formed integrally on first part 50 and second part 52, respectively, and may be interconnected by a central fastener 88. This particular manner of construction assures that the housing 48 swivels as a unit with respect to base 62 and yet does not interfere with the spreading action between first part 50 and second part 52 under action of the clamping device 70.

As previously specified, a leaf spring 90 is positioned between the threaded member 72 and first half 22 of bushing 20. In the preferred embodiment, leaf spring 90 comprises a cylindrically bent, resilient circular disk which is peripherally supported by a shoulder 92 formed within first half 22. Due to its bent configuration, leaf spring 90 defines a peripheral portion 94 which is in force transmitting engagement with first half 22 of bushing 20. As seen in FIG. 3, when spring 90 is interfaced to shoulder 92, the center portion 96 thereof is spaced from first half 22 and in direct contact with the flat end 78 of threaded member 72. Such spacing allows for subsequent resilient movement of the center portion 96 relative the first half 22 since the center portion 96 is biased away from the first half 22. In the preferred embodiment, the center portion 96 extends through the turning axis of the bushing 20 and is engaged by the flat end 78 of threaded member 72 as the clamping device 70 is actuated from the unlocked position to the locked position. As the clamping device 70 is selectively tightened and loosened, any desired degree of relative mobility of the post 12, bushing 20, and housing 48 may be readily realized within a wide range of adjustments. In this respect, the pressure exerted against the bushing 20 via the spring 90 may be chosen so as to only "snug" the bushing 20 against the second part 52, thereby allowing the position of the post 12 to be adjusted before final tightening of the clamping device 70 occurs. When the post 12 is correctly positioned, the clamping device 70 is tightened until the spring 90 bottoms on the first half 22 which serves to arrest all the motions of the parts comprising the mount 10. As can be appreciated, spring 90 also allows a user to loosen the clamping device 70 and reposition the post 12 without having the post immediately fall due to the weight of an object supported thereby.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:
1. A universal adjustable mount comprising;

a base member;
a housing rotatably mounted to said base member;
an elongate post;
a bushing for rotatably receiving and selectively gripping set post, said bushing being mounted within said housing in a manner wherein said bushing is rotatable about an axis;
a clamping means in force transmitting relationship with said housing, said clamping means being selectively actuatable between an unlocked position and a locked position, said lock position placing the housing into locking engagement with the base member and the bushing into locking engagement with the housing and gripping engagement with the post; and
a locking means formed within said housing for maintaining said bushing in locking engagement with said housing when said clamping means is actuated into the locked position, said locking means comprising:
a sloped surface formed within an interior portion of said housing; and
a radiused peripheral edge formed on said bushing;
wherein the actuation of said clamping means to the locked position causes said radiused peripheral edge to be firmly abutted against said sloped surface in a manner preventing said peripheral edge from sliding relative thereto, said sloped surface being formed at an angle such that said peripheral edge will automatically release itself from engagement therewith when said clamping means is actuated to the unlocked position.

2. The device of claim 1 wherein said clamping means comprises a threaded member threaded into said housing and extending substantially along said axis, said threaded member having a firs end in force transmitting relationship with said bushing and a second end including a handle thereon.

3. The device of claim 2 wherein:
said housing comprises a first part and a second part; and
said bushing comprises a first half and a second half;
said threaded member being threadably received into said first part of said housing and in force transmitting relationship with said first hal of said bushing such that actuation of said threaded member to the locked position causes said second half of said bushing to be firmly abutted against said interior portion of said second part of said housing.

4. The device of claim 3 wherein said sloped surface is formed within said interior portion of said second part of said housing and said radiused peripheral edge is formed on said second half of said bushing.

5. The device of claim 4 further comprising a leaf spring having peripheral portions in force transmitting relationship with said bushing and a central portion biased away from said bushing at said axis.

6. The device of claim 5 wherein said leaf spring comprises a resilient disk being peripherally in force transmitting engagement with said first half of said bushing and having at least a center portion spaced from first half and in contact with said threaded member, said disk being operable to bias said bushing against said second part of said housing during actuation of said clamping means from the unlocked position to the locked position in a manner such that the position of said post may be adjusted before said clamping means reaches the locked position.

* * * * *